July 17, 1956  H. C. JOHNSON ET AL  2,754,648
COACTING ENDLESS BELT TYPE ONION HARVESTING DEVICE
Filed Feb. 24, 1953  2 Sheets-Sheet 1
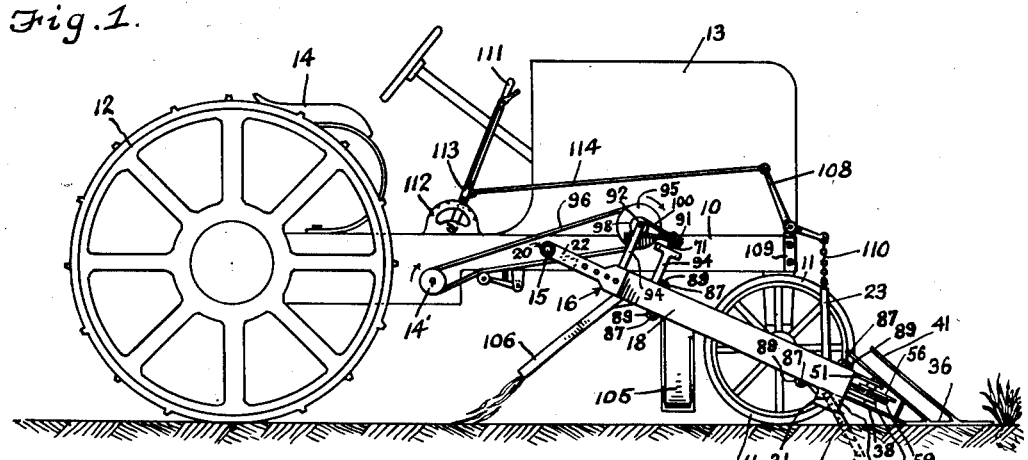
Fig. 1.
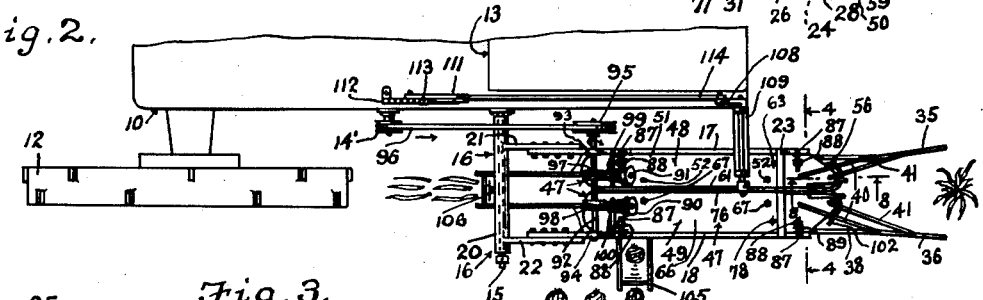
Fig. 2.
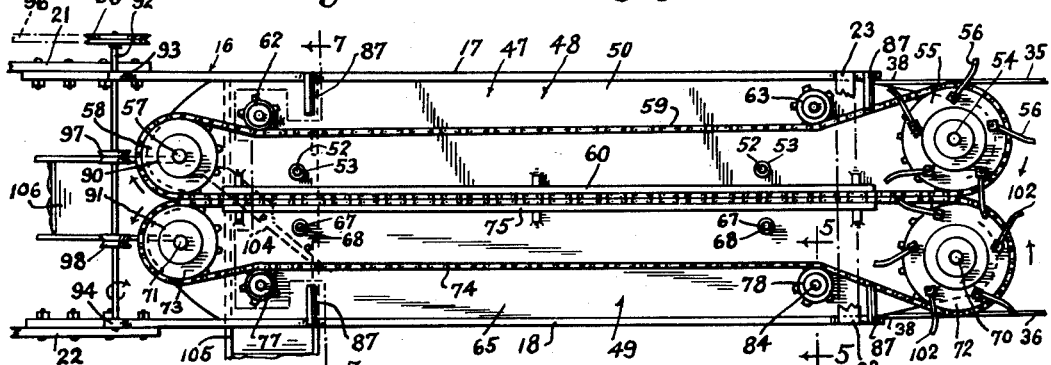
Fig. 3.
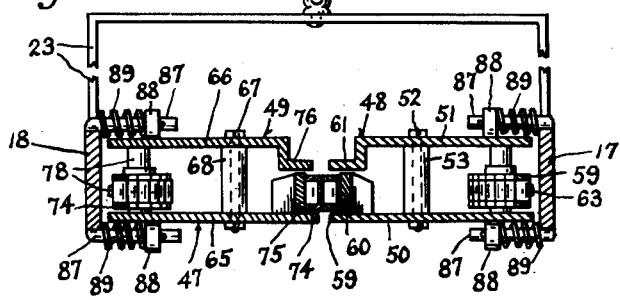
Fig. 4.
Fig. 5.
INVENTORS
Harold C. Johnson
BY James R. Johnson &
McMorrow, Berman & Davidson
Attorneys.

July 17, 1956 — H. C. JOHNSON ET AL — 2,754,648
COACTING ENDLESS BELT TYPE ONION HARVESTING DEVICE
Filed Feb. 24, 1953 — 2 Sheets-Sheet 2
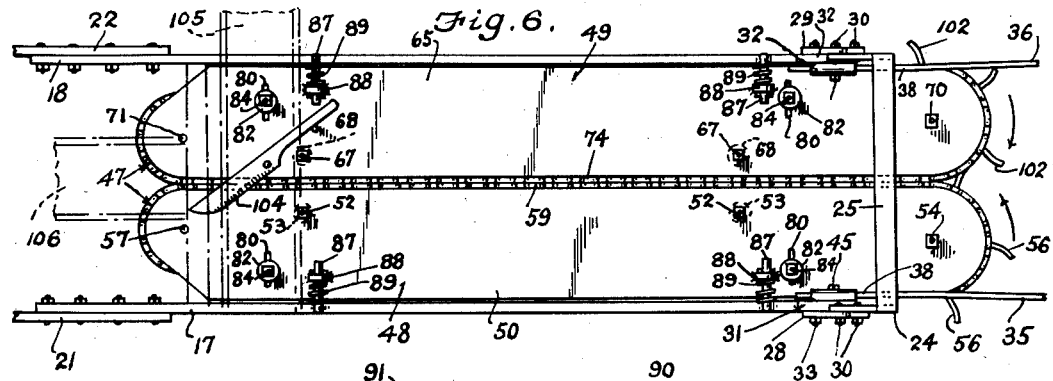
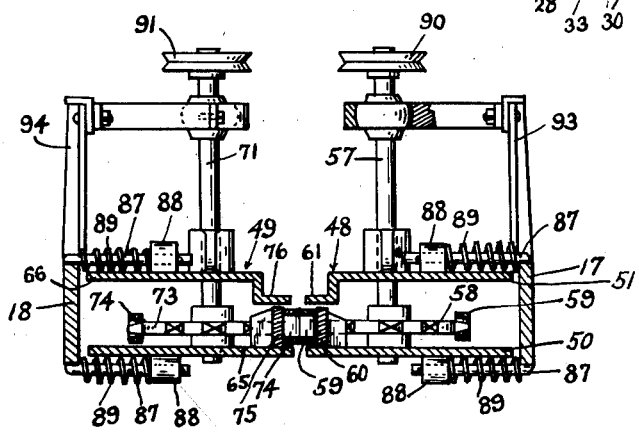
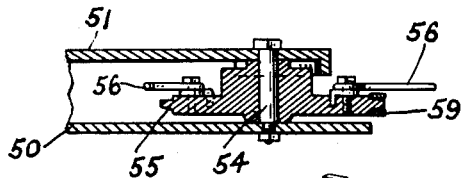
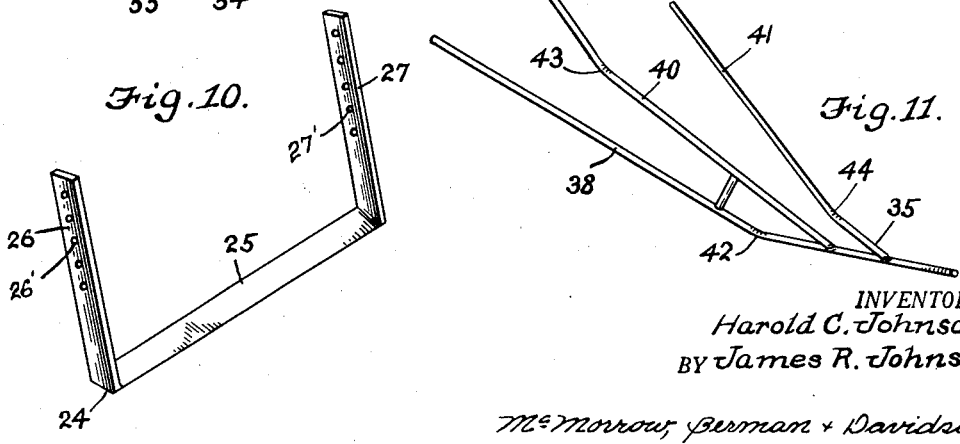
INVENTORS
Harold C. Johnson &
BY James R. Johnson
McMorrow, Berman & Davidson
Attorneys.

United States Patent Office 2,754,648
Patented July 17, 1956

2,754,648
COACTING ENDLESS BELT TYPE ONION HARVESTING DEVICE

Harold C. Johnson and James R. Johnson, Vale, Oreg.

Application February 24, 1953, Serial No. 338,274

4 Claims. (Cl. 55—108)

This invention relates to onion harvesting devices and more particularly to an onion harvesting device in the form of an attachment for an agricultural tractor.

It is among the objects of the invention to provide an onion harvesting device which can be easily mounted on an agricultural tractor and driven by the tractor to dig onions from the soil in which they are grown, top the onions, and move the topped onions and the onion tops to separate locations, which pulls the onions from the soil by the onion tops and severs the onion roots before pulling the onions from the soil, which adjusts itself to onion tops of different thicknesses; and which is simple and durable in construction, economical to manufacture, easy to use, and effective and efficient in operation.

Other objects and advantages will become apparent from a consideration of the following description and the appended claims in conjunction with the accompanying drawings wherein:

Figure 1 is a side elevational view of an agricultural tractor with an onion harvesting attachment illustrative of the invention operatively mounted thereon;

Figure 2 is a partial top plan view of the tractor and attachment illustrated in Figure 1;

Figure 3 is a top plan view on an enlarged scale of the onion harvesting attachment with certain parts thereof omitted;

Figure 4 is a transverse cross sectional view on an enlarged scale on the line 4—4 of Figure 2;

Figure 5 is a fragmentary cross sectional view on an enlarged scale on the line 5—5 of Figure 3, with the chain being omitted;

Figure 6 is a bottom plan view of the onion harvesting attachment;

Figure 7 is a cross sectional view on an enlarged scale on the line 7—7 of Figure 3;

Figure 8 is a fragmentary cross sectional view on an enlarged scale on the line 8—8 of Figure 2;

Figure 9 is an enlarged fragmentary perspective view of a frame member of the attachment;

Figure 10 is an enlarged perspective view of a root severing blade constituting an operative component of the attachment; and Figure 11 is an enlarged perspective view of a guide structure also constituting an operative component of the attachment.

With continued reference to the drawings, the tractor diagrammatically illustrated in Figures 1 and 2 may be any known form of agricultural tractor and includes a tractor frame 10 supported at its front end on the front steering wheels 11 of the tractor and at its rear end on the rear driving wheels, one of which is illustrated and designated at 12. The tractor frame 10 supports the tractor engine 13 on the front portion of the frame and a driver's seat 14 rearwardly of the engine. A power take off connection in the form of a belt pulley 14' is disposed at one side of the frame and driven from the tractor engine and a cultivator mounting bar 15 extends perpendicularly outward from the tractor frame between the power take off connection 14' and the front end of the frame, there normally being two cultivator mounting bars in the conventional tractor projecting perpendicularly outwardly from the respectively opposite sides of the tractor frame and substantially horizontally disposed for connecting cultivators to the tractor, one at each side of the tractor.

The onion harvesting attachment is generally indicated at 16, and is pivotally mounted at its rear end on a cultivator mounting bar 15 for vertical swinging movement and will extend forwardly and downwardly from the associated cultivator mounting bar, so that its front end is disposed adjacent the surface of the ground near the front end of the tractor.

The onion harvesting attachment 16 has a frame including spaced apart and substantially parallel side rails 17 and 18, a tubular end member 20 extending transversely of the frame at one end thereof and joined to the side rails 17 and 18 by the flattened arms 21 and 22 respectively, which arms project perpendicularly from the tubular end member 20 at spaced apart locations along the end members and are joined to the corresponding ends of the side rails 17 and 18. The connections between the arms 21 and 22 and the corresponding side rails 17 and 18 are preferably adjustable, so that the frame can be adjustably lengthened or shortened within practical limits for different installations of the attachment.

A bail 23 of rectangular shape and rigid construction is disposed above and transversely of the frame at the end of the frame remote from the tubular cross member 20 and is rigidly secured at its ends to the side rails 17 and 18 to maintain the corresponding ends of the side rails spaced apart substantially the same distance as the ends of the side rails adjacent the cross member 22 are spaced apart. A root blade 24 is disposed below and transversely of the frame at the end of the frame adjacent the bail 23, and this blade is of rectangular cross sectional shape and has an intermediate portion 25 which operates below the surface of the ground and is provided with a cutting edge 25' to sever onion roots at the lower ends of the onions while the onions are still in the soil in which they were grown. The legs 26 and 27 of the blade structure are provided with series of apertures 26' and 27' respectively spaced apart longitudinally of the corresponding legs and these legs are attached to splice plates 28 and 29 by bolts, as indicated at 30, extending through selected apertures in the blade legs and the corresponding splice plates to position the intermediate portion of the blade at selected distances below the adjacent end of the attachment frame, the splice blades 28 and 29 being secured to lug formations 31 and 32 extending downwardly from the lower edges of the corresponding frame side rails 17 and 18 by bolts, as indicated at 33. The blade 24 assists the bail 23 in holding the corresponding ends of the frame side rails 17 and 18 in properly spaced apart relationship relative to each other.

Guide structures 35 and 36 are disposed at the lower, front end of the attachment frame in side by side relationship to each other for guiding onion tops to the center of the width of the frame as the harvesting attachment is moved along a row of standing onions, for a purpose to be presently explained. Each of these guide structures, as illustrated in Figure 11, comprises an elongated rod 38 secured at one end in an aperture 39 in the corresponding frame side member and extending longitudinally of the side member to the front end thereof, and guide fingers 40 and 41 secured, each at one end to the rod 38 at spaced apart locations along this rod and near the end thereof remote from the front end of the associated frame side member. The rod 38 is angularly bent intermediate its length, as indicated at 42, and the fingers 40 and 41 are also angularly bent, as indicated at 43 and 44, to shape the guide structure so that the two complementary structures effectively guide the onion tops to the center of the width of the associated frame. The guide structures are held in proper position relative to the associated frame members by suitable means, such as the set screw 45 threaded through a tapped hole in the frame side rail intermediate the length of the bore 39 and extending at its inner end into the bore 39 to engage the portion of the rod 38 received in this bore to rigidly lock the corresponding guide structure in properly adjusted position relative to the associated frame side rail.

An elevator structure, generally indicated at 47, is disposed in the frame between the side rails 17 and 18 and extends longitudinally of the frame from a location spaced from the tubular member 20 to the end of the frame adjacent the bail 23. This elevator structure includes two similar and complementary conveyor units 48 and 49 disposed in edge to edge relationship between the frame side rails 17 and 18.

The conveyor unit 48 comprises bottom and top plates 50 and 51 held in spaced apart and substantially parallel relationship to each other by bolts, as indicated at 52, extending through the plates and spacing sleeves, as indicated at 53, surrounding the bolts between the plates. A shaft 54 is journaled in the bottom and top plates 50 and 51 at the end of the unit 48 adjacent the bail 23 and extends across the space between these plates substantially perpendicular to the major surfaces of the plates. A chain sprocket 55 is mounted on the shaft 54 between the plates 50 and 51 and spring fingers 56 are mounted on the sprocket 55 and project outwardly of the periphery of the sprocket for a purpose to be later explained. A shaft 57 is journaled in the plates 50 and 51 at the opposite end of the unit 48, extending across the space between the plates perpendicular to the major surfaces of the plates, and a chain sprocket 58 is mounted on the shaft 57 between the plates 50 and 51. An endless chain 59 is trained around the sprockets 55 and 58 and has one portion thereof extending along the edges of the plates 50 and 51 adjacent the elevator unit 49. A guide bar 60 secured to the bottom plate 50 adjacent the unit 49 extends along the edge of this plate and bears against the inner side of the adjacent portion of the chain 59 to maintain this portion of the chain substantially straight and parallel to the adjacent straight side edge of the plate 50, and an angle member 61 extends between and is secured to the edge of the bar 60 remote from the plate 50 and the edge of the plate 51 adjacent the unit 49 to define retaining and guiding means above the upper longitudinal edge of the chain 59 for maintaining the chain in its path of movement along the guide bar 60 and prevent its displacement upwardly, as clearly shown in Figure 4. Chain tightening idler sprockets 62 and 63 are disposed in the space between the plates 50 and 51 between the frame side rail 17 and the adjacent side of the chain 59 and bear against the corresponding side of the chain to maintain the chain in a tight condition.

The unit 49 is similar, in all respects, to the unit 48, and includes bottom and top plates 65 and 66 held in spaced apart and substantially parallel relationship to each other by bolts, as indicated at 67, extending through both plates and tubular spacers, as indicated at 68, surrounding the bolts between the plates. Shafts 70 and 71 are journaled in the plates 65 and 66 at the respectively opposite ends of the unit 49 and chain sprockets 72 and 73 are disposed within the space between the plates 65 and 66 and mounted on the shafts 70 and 71 respectively. An endless chain 74 is trained around the sprockets 72 and 73 and has one side thereof extending along the edge of the plate 65 adjacent the unit 48 and held in position along this edge of the plate 65 by a guide bar 75 secured to the plate 65 and extending along the side edge of this plate adjacent the unit 48 and from the plate 65 toward the top plate 66. An angle member 76 extends between and is secured to the upper edge of the guide bar 75 and the edge of the plate 66 adjacent the unit 48 and chain tightening idler sprockets 77 and 78 are disposed between the frame side rail 18 and the adjacent side of the chain 74 in the space between the plates 65 and 66 and bear against the adjacent portion of the chain 74 to maintain this chain in a tightened condition.

As illustrated in Figure 5, the plates 65 and 66 are provided at the locations of the idler pulleys 77 and 78 with transversely elongated apertures 80 and 81 respectively, and flanged washers 82 and 83 are disposed in the apertures 80 and 81 respectively, with their flanges bearing on the outer surfaces of the plates 65 and 66. A bolt 84 extends through the washers 82 and 83 and has a head bearing against the outer end of the washer 82 and a nut bearing against the outer end of the washer 83, so that the washers can be clamped together in selected positions of adjustment longitudinally of the slots 80 and 81. The idler sprocket 78 is journaled on the bolt 84 near the bottom plate 65, and a spring 85 is disposed between this sprocket and the washer 83 to maintain the sprocket in alignment with the adjacent portion of the chain 74. By this means, the idler sprocket can be moved transversely of the corresponding bottom and top plates of the elevator units to tighten the associated chains, as may be necessary.

Pins, as indicated at 87, project inwardly from the frame side rails 17 and 18 above the top walls of the units 48 and 49, and below the bottom walls of these units, and at spaced apart locations along the units, and the top and bottom walls of the units are provided with outwardly projecting, apertured lugs, as indicated at 88, in which the corresponding pins are slidably received. Coiled compression springs, as indicated at 89, surround the pins 87 between the corresponding side rails 17 and 18 and the associated lugs 88 and resiliently urge the units 48 and 49 away from the corresponding frame side rails and toward each other, so that the sides of the chains 59 and 74 at the outer sides of the guide bars 60 and 75 are resiliently pressed together to grasp onion tops therebetween and move the onions longitudinally of the elevator structure when the elevator structure is driven in the manner presently to be described.

The shafts 57 and 71 are extended upwardly above the corresponding top plates 51 and 66 of the elevator units 48 and 49, and chain sprockets or belt pulleys 90 and 91 are mounted on the upper ends of the shafts 57 and 71 respectively. A shaft 92 is disposed above and transversely of the attachment frame near the ends of the side rails 17 and 18 to which the arms 21 and 22 are connected and is journaled in bearing standards 93 and 94 projecting upwardly from the side rails 17 and 18 respectively. A belt pulley 95 is mounted on one end of the shaft 92 and the power take off connection pulley 14' is drivingly connected to the pulley 95 by a belt 96. Belt pulleys 97 and 98 are mounted on the shaft 92 between the side rails 17 and 18 and are respectively connected to the belt pulleys 90 and 91 by belts 99 and 100, so that the sprockets 58 and 73 are driven through the corresponding shafts 57 and 71 from the power take off pulley or connection 14'. The sprockets 58 and 73 are driven in opposite directions such that the sides of the chains 59 and 74 adjacent each other are moved together in a direction from the end of the frame to which the bail 23 is connected to the end of the frame to which the tubular cross member 20 is connected.

With this arrangement, as the attachment 16 is moved along a row of onions in the soil in which they were grown, the blade 24 first severs the onion roots adjacent the lower ends of the onions, and the guide structures 35 and 36 then guide the onion tops between the chain sprockets 55 and 72 at the front end of the attachment. The fingers 56 and 102 on the sprockets 55 and 72 respectively, pull the onion tops between these sprockets and between the opposed sides of the chains 59 and 74, so that the chains grasp the onion tops between them and move the onions longitudinally of the attachment from the front toward the rear end of the attachment. The springs 89 permit the units 48 and 49 to move toward or away from each other to a limited extent, so that onion tops of various thicknesses can be received between the opposed sides of the chains, and the pressure of the chains on the thicker onion tops will not be sufficient to sever the tops.

A topping blade 104 is disposed immediately below the elevator structure 47 adjacent the rear end of this structure, that is, the end adjacent the tubular cross member 20, and this blade is secured to the bottom wall of the unit 49 and extends across the space between the adjacent edges of the bottom walls 50 and 65. As the onions are moved by the conveyor chain against the topping blade or knife 104, they are severed from the tops grasped by the chain and dropped downwardly from the location of the topping knife. An onion receiving chute 105 has its upper end disposed below the topping knife 104 and extends downwardly and outwardly of the corresponding attachment 16 to deposit the onions in a row spaced from the path of the associated tractor.

After the onions have been severed from the tops, the tops are carried by the chains to the rear end of the conveyor structure where they are discharged into a top chute 106 which is inclined rearwardly and downwardly from the rear end of the elevator structure to convey the tops as they are discharged from the elevator downwardly to the ground at a location spaced from the location at which the onions are deposited.

A bell crank lever 108 is pivotally mounted at its angle on a bracket 109 secured to the front end of the tractor frame, and one end of this bell crank lever is connected by a suitable flexible element, such as the chain 110, to the bail 23. A hand lever 111 is disposed between the tractor seat 14 and the tractor engine 13 and pivotally mounted at its lower end on a quadrant 112 mounted on the tractor frame. This lever carries a detent 113 selectively engageable with notches in the quadrant 112 to releasably hold the lever at selected positions of angular adjustment relative to the quadrant. A link 114 connects the hand lever 111 to the end of the bell crank lever 108 remote from the flexible element 110, so that the hand lever can be used to turn the bell crank lever about its pivotal connection with the fixed bracket 109, and to thereby raise and lower the front end of the attachment 16.

While the described structure refers to the attachment being mounted on one side of the associated tractor, it will be appreciated, that a similar attachment may be similarly mounted on the other side of the tractor within the scope and concept of this invention.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. An onion harvesting attachment for tractors comprising a pair of rails arranged in parallel relation adapted to be positioned in an upwardly sloping direction on one side of a tractor, means on the upper ends of said rails for connecting said rails to the frame of the tractor for movement in a vertical arcuate path, an elevator structure including a pair of endless gripping members lying between and in a common plane with said rails and connected to the latter to move in opposite directions in similar closed paths about spaced axes adjacent opposite ends of said rails and perpendicular to said common plane, the adjacent runs of said gripping means being in confronting face to face relation to grip the tops of harvested onion plants therebetween and carry the plants upwardly, severing means carried by said rails and extending below and across the paths of movement of said confronting runs to cut the tops from the plants, means on one of said spaced axes for imparting said movement to said gripping members, and a plurality of circumferentially spaced fingers carried on another one of said axes for rotation about said another one of said spaced axes, said fingers being adjacent to move them into position to be gripped between said adjacent runs of the gripping members.

2. An onion harvesting attachment for tractors comprising a pair of rails arranged in parallel relation adapted to be positioned in upwardly sloping direction on one side of a tractor, means on the upper ends of said rails for connecting said rails to the frame of the tractor for movement in a vertical arcuate path, an elevator structure including a pair of conveyor units positioned between and carried by said rails and lying in a common plane with said rails, a pair of endless gripping members, one of said members carried by each of said units for movement in a closed path about spaced axes adjacent opposite ends of the unit perpendicular to said common plane with the direction of movement of one member being opposite to the direction of movement of the other member and adjacent thereto, the adjacent runs of said gripping means being in confronting face to face relation to grip the tops of harvested onion plants therebetween and carry the plants upwardly, severing means carried by said rails and extending below and across the paths of movement of said confronting runs to cut the tops from the plants, means on one of said spaced axes for imparting said movement to said gripping members, and a plurality of circumferentially spaced fingers carried on another one of said spaced axes for rotation about said another one of said spaced axes, said fingers being adjacent the lower end of said rails for engaging the harvested plants to move them into position to be gripped between said adjacent runs of the gripping members.

3. An onion harvesting attachment for tractors comprising a pair of rails arranged in parallel relation adapted to be positioned in upwardly sloping direction on one side of a tractor, means on the upper ends of said rails for connecting said rails to the frame of the tractor for movement in a vertical arcuate path, an elevator structure including a pair of conveyor units positioned between and carried by said rails and lying in a common plane with said rails, a pair of endless gripping members, one of said members carried by each of said units for movement in a closed path about spaced axes adjacent opposite ends of the unit perpendicular to said common plane with the direction of movement of one member being opposite to the direction of movement of the other member and adjacent thereto, the adjacent runs of said gripping means being in confronting face to face relation to grip the tops of harvested onion plants therebetween and carry the plants upwardly, cooperating guide means carried by said units for guiding said gripping members in their paths of movement along their confronting runs, severing means carried by said rails and extending below and across the paths of movement of said confronting runs to cut the tops from the plants, means on one of said spaced axes for imparting said movement to said gripping members, and a plurality of circumferentially spaced fingers carried on another one of said spaced axes for rotation about said another one of said spaced axes, said fingers being adjacent the lower end of said rails for engaging the harvested plants to move them into position to be gripped between said adjacent runs of the gripping members.

4. An onion harvesting attachment for tractors comprising a pair of rails arranged in parallel relation adapted to be positioned in upwardly sloping direction on one side of a tractor, means on the upper ends of said rails for connecting said rails to the frame of the tractor for movement in a vertical arcuate path, an elevator structure including a pair of conveyor units positioned between and carried by said rails and lying in a common plane with said rails, a pair of endless gripping members, one of said members carried by each of said units for movement in a closed path about spaced axes adjacent opposite ends of the unit perpendicular to said common plane with the direction of movement of one member being opposite to the direction of movement of the other member and adjacent thereto, the adjacent runs of said gripping means being in confronting face to face relation to grip the tops of harvested onion plants therebetween, and carry the plants upwardly, severing means carried by said rails and extending below and across the paths of movement of said confronting runs to cut the tops from the plants, means on one of said spaced axes for imparting said movement to said gripping members, and a plurality of circumferentially spaced fingers carried on another one of said spaced axes for rotation about said another one of said spaced axes, said fingers being adjacent the lower end of said rails for engaging the harvested plants to move them into position to be gripped between said adjacent runs of the gripping members, and resilient means carried by each of said rails and operatively connected to the adjacent conveyor unit for yieldingly urging said confronting runs of said endless members toward each other and permitting lateral movement away from each other against the effort of said resilient means to accommodate the thickness of the plants gripped therebetween.

References Cited in the file of this patent
UNITED STATES PATENTS

| | | |
|---|---|---|
| 2,476,336 | Urschel | July 19, 1949 |
| 2,507,687 | Andrews | May 16, 1950 |
| 2,513,941 | Hyman | July 4, 1950 |